Patented Nov. 2, 1948

2,452,793

UNITED STATES PATENT OFFICE 2,452,793

ABRASIVE PRODUCTS

Norman P. Robie, Lewiston, N. Y., assignor to The Carborundum Company, Niagara Falls, N. Y., a corporation of Delaware No Drawing. Application April 3, 1946, Serial No. 659,435

17 Claims. (Cl. 51—308)

This invention relates to the production of abrasive articles and more particularly to the production of flexible abrasive articles such as abrasive paper, cloth and the like and has as an object the production of novel improved articles of this type.

Hitherto in the process of manufacturing such articles by affixing an abrasive coating on backings such as those made of paper and/or cloth, it has been customary to use glue or varnish as the adhesive. More recently there have been used as adhesives various synthetic resins as solutions in organic solvents or in liquid form. Such resins are, however, expensive and other adhesives have been desired.

I am aware of early attempts to use sodium silicate as an adhesive in the making of abrasive coated products and the failure of the resulting articles because of the pronounced property of the silicate adhesive to pick up moisture and/or carbon dioxide from the surrounding atmosphere with a resulting loss in strength and general deterioration of the binder. Previous efforts to remedy this defectiveness in silicate adhesives have so far provided no satisfactory solution to the problem.

I have found that solutions of soluble silicates and certain other compounds, as for example, dimethylol urea can be mixed in all proportions and the resulting adhesive compositions are highly satisfactory as adhesives for use in the production of flexible abrasive-coated articles. The resulting compositions, in spite of the fact that they contain substantial amounts and usually a major proportion of a soluble silicate, overcome the aforementioned faults of soluble silicate adhesives when the latter are used alone, and permit the production of flexible abrasive articles of high quality.

I have found that the presence of as little as .3% of dimethylol urea in a sodium silicate solution serves to effectively stabilize the latter so that when it is used as an adhesive in the making of abrasive-coated products such products remain stable in cutting character for many months after their fabrication, and that the initial high cutting rate of such products is retained.

Flexible abrasive-coated articles are usually made by applying to a backing which may be paper, cloth, vulcanized fiber, or a composite sheet of one or more such flexible materials, a layer of adhesive usually known as the making coat. Abrasive grain, such as particles of garnet, alumina, silicon carbide or the like is then applied to the making coat and another application of adhesive known in the art as a sizing coat is thereupon applied.

In accordance with the present invention I have used as an adhesive for the above-mentioned purposes mixtures of soluble silicates with a compound, such as dimethylol urea, in various proportions of the two with highly satisfactory results. The class of compounds which I find useful in practice of the present invention are the initial water-soluble, condensation products of an aldehyde, such as formaldehyde, and a urea. Such compounds, upon the action of heat and/or a catalyst are resin-forming. I have found that the addition of very small amounts of a compound of the type of a methylol urea, such as dimethylol urea, to a soluble silicate solution such as sodium silicate serves to stabilize the latter so that when the resulting mixture is used as the adhesive for abrasive-coated products the silicate is so stabilized against attack by moisture and carbon dioxide contained in the surrounding atmosphere that such products are capable of use many months after their fabrication.

The modified silicate adhesive compositions of the present invention can be used for both the making coat and the sizing coat of adhesive, although I have found that highly satisfactory results can be obtained when the herein-described modified silicate adhesives are used as the sizing coat over a making coat which may be a straight silicate adhesive, a silicate adhesive containing a filler or the like, or an adhesive composition of entirely different character, such as animal or hide glue.

Upon suitable heat treatment the dimethylol urea, or equivalent compound, in the adhesive compositions herein described reacts to form a reaction product in such a way, not entirely understood, as to render the silicate content of the adhesive highly stable and resistant to deterioration, and set the adhesive binder to a strong, durable, heat-hardened condition.

The following specific examples are given by way of illustration of the various modes of application of the soluble silicate-dimethylol urea adhesive compositions as binders in flexible abrasive articles in accordance with the teachings of the present invention.

EXAMPLE I

Adhesive composition

| | Percent by weight |
|---|---|
| "J" grade sodium silicate | 50.5 |
| "O" grade sodium silicate | 25.2 |
| Albany clay | 15.1 |
| Dimethylol urea | 9.2 |

The above adhesive composition is prepared by dissolving the dimethylol urea in hot water in the proportion of 40 by weight of dimethylol urea to 60% by weight of hot water. The resulting solution is added to a mixture of "J" and "O" grade silicates to which the clay has already been added to yield a final composition of the named proportions. In most cases the viscosity of the resulting solution will be satisfactory for sizing operations. However, if it is too viscous a slight amount of water may be added to bring the viscosity of the material down to the desired point.

A flexible backing material, commonly referred to in the abrasive trade as "combination" backing, and consisting of a layer of vulcanized fiber adhesively combined to a layer of cloth, and of the type ordinarily used in making coarse grit abrasive products such as flexible abrasive discs is first coated with a mixture of 7 parts by weight of "J" grade sodium silicate and 3 parts by weight of "O" grade sodium silicate. The "J" grade silicate has a specific gravity of about 1.68, a $Na_2O:SiO_2$ ratio of about 1:2, and contains 54% solids; the "O" grade silicate has a specific gravity of about 1.40, a $Na_2O:SiO_2$ ratio of about 1:3, and contains 40% solids. The particular silicate solutions referred to can be obtained in the specified gradings from the Philadelphia Quartz Company of Philadelphia, Pennsylvania. A coating of 24 grit fused alumina abrasive grain is then applied to the adhesively-coated surface while the adhesive is still wet. The abrasive-coated surface is then sized with the above silicate-dimethylol urea adhesive composition. After sizing, the abrasive-coated and sized material is carefully dried at 125° F. for several hours, after which it is raised at the rate of 25° F. per hour to 225° F. and held at the latter temperature for four hours.

Abrasive coated discs made in accordance with the above procedure and embodying the silicate-dimethylol urea adhesive composition set forth above as the sizing coat, shortly after their fabrication, were subjected to grinding tests under controlled conditions and in the grinding of steel were found to remove 206 grams of metal with a disc weight loss of only 6 grams. Similar discs when subjected to the same grinding tests after storage for periods as great as one year were found to have substantially the same cutting rate and the same disc loss. Discs similar to those described except that no dimethylol urea was used were practically useless after a few months storage.

Although approximately 10% by weight of dimethylol urea is shown in Example 1 (which provides about 20% resin in the finished article), comparable results were obtained in the making of abrasive-coated discs by using a similar sizing adhesive in which the dimethylol urea amounted to only 3.3% by weight of the liquid adhesive composition, the balance of the sizing composition comprising a mixture of "J" and "O" grade silicates and Albany clay in substantially the same proportions set forth in the sizing composition for Example I.

EXAMPLE II

Abrasive belts suitable for wood sanding operations can be made as follows:

An adhesive composition consisting of 43% by weight dimethylol urea and 57% "J" grade sodium silicate is made by dissolving the dimethylol urea in the minimum amount of hot water required to effect the solution (approximately equal parts water and dimethylol urea) and the dimethylol urea solution then mixed with the "J" grade silicate solution. Paper backing known as 130 pound cylinder paper is roll coated with 3 to 4 pounds per ream of a 50% solution of "J" grade silicate and 100 grit fused alumina abrasive grain electrostatically applied to the wet adhesive-coated surface. After drying at 100° F. for ½ hour the abrasive-coated material is sized with 8–10 pounds per ream of the sodium silicate-dimethylol urea composition as above prepared. The sized material is then dried at 110° F. for five hours, after which the temperature is raised at 25° per hour to 225° F. and cured two hours at the latter temperature. The material is then ready to be fabricated into abrasive belts and other forms suitable for use by the wood sanding trade.

The table below illustrates the results to be obtained by the use of silicate-dimethylol urea adhesives in the making of abrasive-coated products for wood sanding as compared to the unsatisfactory results to be obtained by using either ingredient alone:

*Grinding tests*

| Adhesive Composition | Grms. of Wood Removed per Hour | |
| --- | --- | --- |
| | Shortly after Fabrication | One Year Later |
| 57% "J" grade sodium silicate, 43% dimethylol urea. | 1,574 | 1787. |
| 100% "J" grade sodium silicate. | 1,734 | Adhesive unsatisfactory for use due to deterioration of bond by $CO_2$ + moisture of the atmosphere. |
| 100% dimethylol urea | 491 | |

As shown in the above table wherein 100 grit size fused alumina abrasive belts were subjected to identical wood grinding operations under controlled conditions, the belt embodying the sodium silicate-dimethylol urea adhesive composition had a satisfactory cutting rate which was fully preserved after a period of one year storage. On the other hand a similar belt using 100% unmodified sodium silicate of the same grade when subjected to the same test, although initially satisfactory, was unacceptable because of the unstable character of the silicate bond which deteriorated upon standing due to attack by the $CO_2$ and moisture of the atmosphere. Similar belts made with 100% dimethylol urea as the bond did not have a sufficiently high cutting rate to justify further testing.

EXAMPLE III

Flexible abrasive-coated material suited for metal grinding purposes can be made by roll-coating a brown flexible drill cloth with a making coat of 42% Peter Cooper "Z" grade glue solution (made and sold by Peter Cooper Corporation, Gowanda, New York) using 11 pounds per ream of the glue solution, followed by depositing 41 pounds per ream of 50 grit size aluminum oxide abrasive grain onto the wet adhesively-coated surface. After air drying, the abrasive-coated material is sand sized using a solution made up as follows:

| | Parts by weight |
| --- | --- |
| "J" grade sodium silicate | 2000 |
| "O" grade sodium silicate | 1000 |
| Albany clay | 800 |
| Dimethylol urea | 200 |

The dimethylol urea is first dissolved in a minimum of hot water (about 200 parts by weight), added to the silicate mixture, and the clay is then mixed into the solution. Water is then added to reduce the solution to a viscosity of about 800 centipoises and 18 pounds per ream of the solution applied to the abrasive-coated material as a sand size. The sized material is air dried for eight hours and finally cured at 175° F. for six hours. The resulting material is highly satisfactory for grinding metals.

The physical properties of the coatings may be modified in various ways as, for example, by the addition of flexibilizing agents to the silicate solutions. Among such agents which can be used are polyhydric alcohols such as glycerol, mannitol, sorbitol and diethylene glycol, polyhydric alcohol-boric acid resins such as glyceryl or glycol bori-borate, alkaline resin solutions, aqueous emulsions or dispersions of flexible resins, and organic alkalies such as triethanolamine. As will be noted, certain of these flexibility modifying agents also possess adhesive properties and the use thereof will assist in the bonding of the abrasive grains.

Fillers other than the Albany clay shown in Examples I and III, may also be incorporated in my soluble silicate adhesives. The fillers may be inert inorganic ones such, for example, as powdered silica or organic ones such as cellulosic fibers. Such fillers permit a very slow, gradual breaking away of the dulled abrasive grit so that the cutting rate of the abrasive article is better maintained.

Although I prefer to use dimethylol urea as the stabilizing ingredient for the soluble silicate and the invention has therefore been described herein primarily as it has been applied using that specific compound, other related compounds of similar composition or like characteristics can be similarly used with the soluble silicate to form the desired adhesive compositions. It is well known that urea and numerous related urea compounds such as thiourea, melamine, trimethyl melamine, guanidine, dicyandiamid, biuret, cyanamid, and various substituted ureas and thioureas can be condensed with an aldehyde such as formaldehyde, to form compounds which are soluble in water at the early stages and which can be caused to react further by the use of catalysts or heat or both to form solid resinous products which are infusible and insoluble in most solvents. Urea and such related urea compounds have the common characteristic that they contain at least one carbon atom bonded to two nitrogen atoms, at least one of the nitrogens being an amino-nitrogen. These initial water-soluble condensation products of an aldehyde and a urea compound can be used in place of the dimethylol urea with soluble silicates to form stabilized silicate adhesive compositions in accordance with the present invention. For example, a water-soluble, A-stage condensation product of urea and formaldehyde can be used in place of all or part of the dimethylol urea.

The expression "a urea compound" as used herein and in the claims is intended to include those compounds enumerated in the preceding paragraph and having those characteristics in common therein described.

The term "sodium silicate" as herein applied is not intended to be restricted to any single chemical compound, but is intended to include those combinations of sodium oxide and silica which in water form viscous solutions having the well-known characteristics of an adhesive.

Also, the term "soluble silicates," as used herein covers not only sodium silicate, but those other alkali oxide silicates of similar characteristics, such as potassium oxide and lithium oxide, which with silica form viscous solutions of adhesive character.

This application is a continuation-in-part application of my earlier application Serial No. 469,232, filed December 16, 1942.

Having described my invention, it is desired to claim:

1. A flexible abrasive-coated article comprising a flexible backing having abrasive particles adhesively secured thereto by a bond comprising the reaction product of a mixture comprising a soluble alkali silicate and a water-soluble, heat hardenable reaction product of an aldehyde and a urea compound.

2. A flexible abrasive-coated article comprising a flexible backing having abrasive particles adhesively secured thereto by a bond comprising the reaction product of a mixture comprising sodium silicate and a water-soluble, heat hardenable reaction product of an aldehyde and a urea compound.

3. A flexible abrasive-coated article comprising a flexible backing having abrasive particles adhesively secured thereto by a bond comprising a soluble alkali silicate adhesive composition stabilized by the presence therein of the heat-reacted end product of a water-soluble, heat hardenable reaction product of an aldehyde and a urea compound.

4. A flexible abrasive-coated article comprising a flexible backing having abrasive particles adhesively secured thereto by a bond comprising a soluble alkali silicate adhesive composition stabilized by the presence therein of the heat-reacted end product of a water-soluble, heat hardenable reaction product of formaldehyde and a urea compound.

5. A flexible abrasive disc comprising a flexible backing having a layer of abrasive particles adhesively secured thereto by an adhesive bond comprising a stabilized alkali silicate composition, the stabilizer for said adhesive containing as an essential ingredient the heat reacted end product of a water-soluble, heat hardenable reaction product of an aldehyde and a urea compound.

6. A flexible abrasive disc comprising a flexible backing having a layer of abrasive particles adhesively secured thereto by an adhesive bond comprising a making coat and a sizing coat of adhesive, at least the sizing coat of said bond comprising a soluble alkali silicate adhesive composition containing the heat-reacted end product of a water-soluble, heat hardenable reaction product of an aldehyde and a urea compound.

7. A flexible abrasive disc comprising a flexible backing having a layer of abrasive particles adhesively secured thereto by an adhesive bond comprising a making coat and a sizing coat of adhesive, at least the sizing coat of said bond comprising a soluble alkali silicate adhesive composition containing approximately 20% by weight of the heat-reacted end product of a water-soluble heat-hardenable reaction product of an aldehyde and a urea compound.

8. A flexible abrasive-coated article comprising a flexible backing having abrasives particles adhesively secured thereto by a bond comprising a making coat comprising glue and a sizing coat comprising the reaction product of a mixture comprising a soluble alkali silicate and a water-soluble, heat hardenable reaction product of an aldehyde and a urea compound.

9. A flexible abrasive-coated article comprising a flexible backing having abrasive particles adhesively secured thereto by a bond comprising a making coat and a sizing coat, at least the sizing coat of said bond comprising the reaction product of a mixture comprising a soluble alkali silicate and a water-soluble, heat hardenable reaction product of an aldehyde and a urea compound.

10. A flexible abrasive-coated article comprising a flexible backing having abrasive particles adhesively secured thereto, by a bond comprising a making coat and a sizing coat, at least the sizing coat of said bond comprising a filler and the reaction product of a mixture comprising a soluble alkali silicate and a water-soluble, heat hardenable reaction product of an aldehyde and a urea compound.

11. A flexible abrasive-coated article comprising a flexible backing having abrasive particles adhesively secured thereto by a bond comprising the reaction product of a mixture comprising a soluble alkali silicate and dimethylol urea.

12. A flexible abrasive-coated article comprising a flexible backing having abrasive particles adhesively secured thereto by a bond comprising the reaction product of a mixture comprising sodium silicate and dimethylol urea.

13. A flexible abrasive-coated article comprising a flexible backing having abrasive particles adhesively secured thereto, by a bond comprising a soluble alkali silicate adhesive composition stabilized by the presence therein of the reaction product of a methylol urea.

14. A flexible abrasive disc comprising a flexible backing having a layer of abrasive particles adhesively secured thereto by an adhesive bond comprising a making coating and a sizing coat of adhesive, at least the sizing coat of said bond comprising a soluble alkali silicate adhesive composition containing the reaction product of dimethylol urea.

15. A flexible abrasive-coated article comprising a flexible backing having abrasive particles adhesively secured thereto by a bond comprising a making coat and a sizing coat, at least the sizing coat of said bond comprising a filler and the reaction product of a mixture comprising a soluble alkali silicate and dimethylol urea.

16. A flexible abrasive-coated article comprising a flexible backing having abrasive particles adhesively secured thereto by a bond comprising the reaction product of a mixture comprising a soluble alkali silicate and a water-soluble, heat hardenable reaction product of an aldehyde and a urea compound selected from the group consisting of urea, thiourea, melamine, trimethyl melamine, guanidine, dicyandiamid, biuret and cyanamid.

17. A flexible abrasive-coated article comprising a flexible backing having abrasive particles adhesively secured thereto by a bond comprising a soluble alkali silicate adhesive composition stabilized by the presence therein of the heat-reacted end product of a water-soluble, heat hardenable reaction product of formaldehyde and a urea compound selected from the group consisting of urea, thiourea, melamine, trimethyl melamine, guanidine, dicyandiamid, biuret and cyanamid.

NORMAN P. ROBIE.

No references cited.

Certificate of Correction

Patent No. 2,452,793.　　　　　　　　　　　　　　　　　November 2, 1948.

NORMAN P. ROBIE

It is hereby certified that errors appear in the printed specification of the above numbered patent requiring correction as follows:

Column 2, line 57, for the numeral "40" read *40%*; column 6, line 64, claim 8, for the word "abrasives" read *abrasive*; column 7, line 33, claim 14, for "making coating" read *making coat*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*